I. F. TUCKER.
VEHICLE WHEEL.
APPLICATION FILED OCT. 27, 1910.

1,031,891.

Patented July 9, 1912.
2 SHEETS—SHEET 1.

Witnesses
O. B. Baenziger
J. G. Howlett

Inventor
Trett F. Tucker.
By E. S. Wheeler, Attorney.

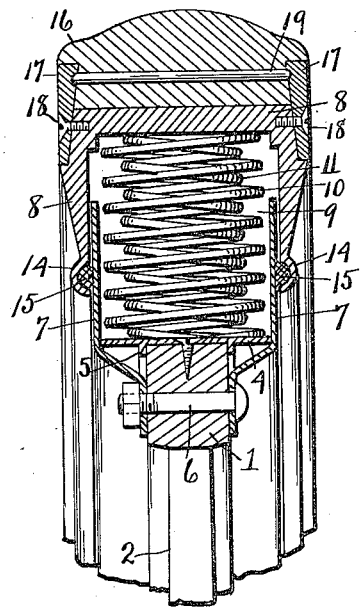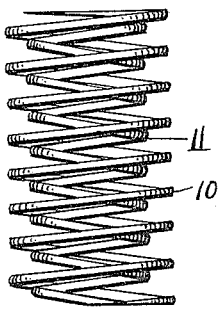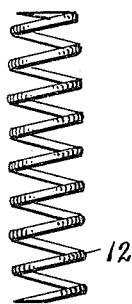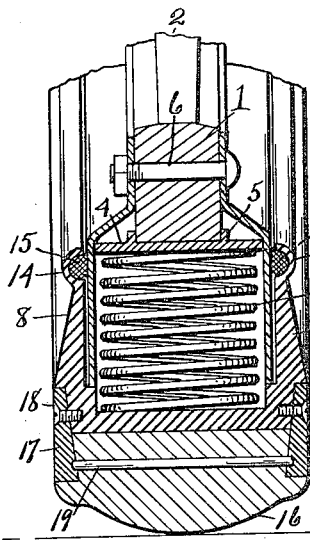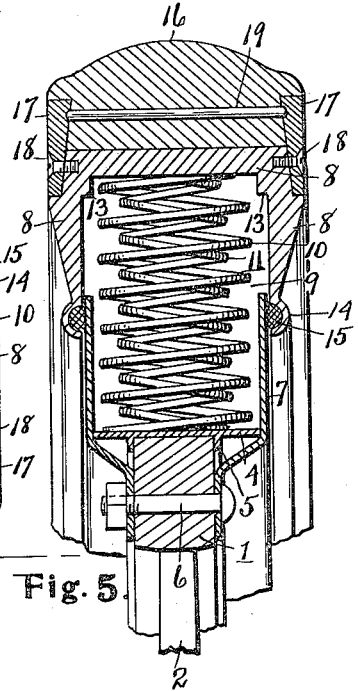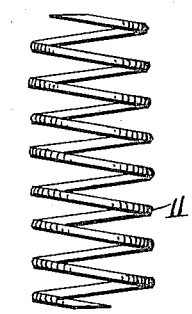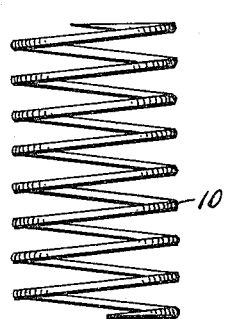

UNITED STATES PATENT OFFICE.

IRETT F. TUCKER, OF SUMNER, MICHIGAN.

VEHICLE-WHEEL.

1,031,891.  Specification of Letters Patent.  Patented July 9, 1912.

Application filed October 27, 1910. Serial No. 589,296.

*To all whom it may concern:*

Be it known that I, IRETT F. TUCKER, a citizen of the United States, residing at Sumner, in the county of Gratiot, State of Michigan, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to vehicle wheels, and consists in the construction and arrangement of parts hereinafter more fully set forth and pointed out particularly in the claim.

The object of the invention is to produce a vehicle wheel of comparatively simple and inexpensive construction in which the arrangement is such as to afford a high degree of resiliency, and at the same time overcome the annoyance and expense incident to the use of the ordinary pneumatic tires.

The above object is attained by the structure illustrated in the accompanying drawings, in which:—

Figure 1:
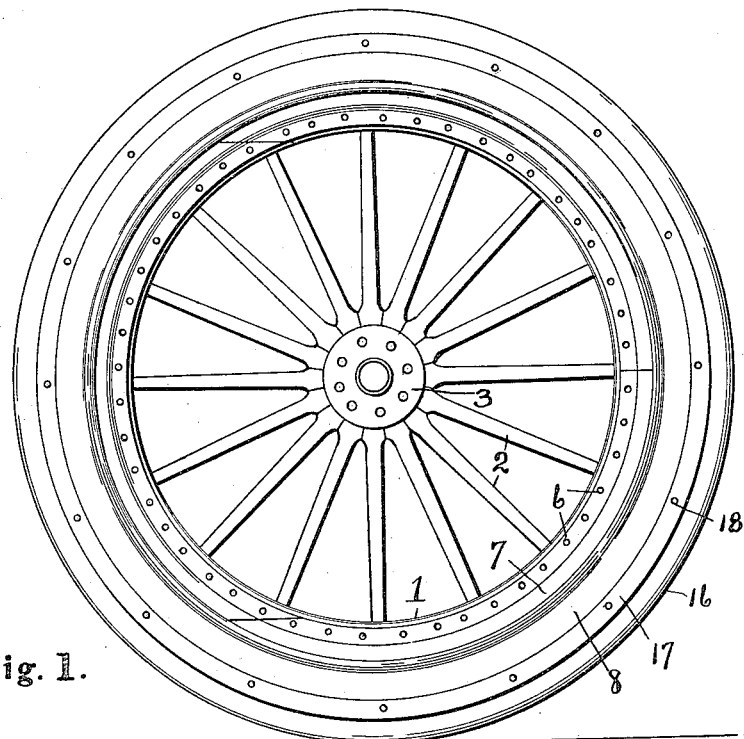
Figure 2:
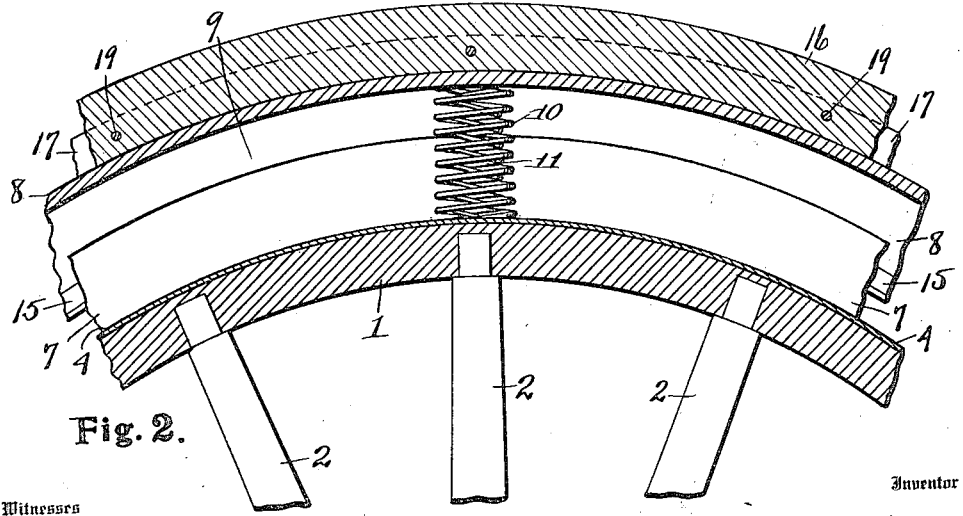

Figure 1 is a side elevation of a vehicle wheel embodying my invention. Fig. 2 is a fragmentary view in circumferential section through a portion of the rim of the wheel. Fig. 3 is a fragmentary view through the rim of the wheel in cross section, the parts being in their normal position. Fig. 4 is a similar view showing the springs in the lower arc of the wheel compressed. Fig. 5 is a view like Fig. 4, showing the springs in the upper arc of the wheel expanded. Fig. 6 is an elevation of one of the composite springs removed from the wheel. Fig. 7 is an elevation of the largest spring. Fig. 8 is an elevation of the intermediate spring adapted to fit within the large spring. Fig. 9 is an elevation of the small spring adapted to fit within the intermediate spring.

Referring to the characters of reference, 1 designates the felly which is made preferably of wood and in the ordinary manner, the spokes 2 being of the usual form and serving to connect the felly and hub 3 in the ordinary manner. Secured to the outer face of the felly is an annular plate 4 whose margins extend laterally on each side thereof and which is provided with flanges 5 between which the felly is confined, thereby providing against lateral movement between said parts. Secured to the sides of the felly by the transverse bolts 6 are the side plates 7 which flare outwardly to embrace the annular plate 4 and whose sides form a portion of the housing in which the load-carrying springs are confined. These plates are made in sections or sectors, as shown in Fig. 1, to facilitate their attachment and removal, and to enable the parts to be assembled. The rim 8 of the wheel is channeled and is formed of an integral part, the sides thereof embracing the side plates 7 in a manner to allow of a radial movement between said parts. The channel in the rim 8 being in the inner face thereof, said channel coöperates with the side plates 7 in forming a closed housing 9 in which the springs are confined. The springs as illustrated are preferably formed of a plurality of coils placed one within the other, comprising a large coil 10, an intermediate coil 11 adapted to be inserted within the coil 10, and a small coil 12 adapted to be inserted within the coil 11. The trend of the successive coils is in opposite directions so that when nested the liability of the coils becoming locked is obviated.

By employing a plurality of nested coils instead of a single coil greater flexibility is obtained and a more uniform action assured. There are employed as many of these nested springs as are required to fill the housing 9 of the wheel circumferentially when placed side by side, as shown in Fig. 2. Instead of using the nested springs I may employ single springs of the requisite strength placed side by side in the housing of the rim; for the reasons stated, however, the nested springs are preferred. The nested springs are placed in the housing 9 formed by the coöperation of the side plates 7 and the channeled rim under compression so that said springs are at all times exerting an outward force against the channeled rim, the length of said springs being such that they are always maintained under tension even when the side plates and the channeled rim are separated to their fullest extent, as shown in Fig. 5, a condition which results whenever the wheel drops into a depression or encounters an obstruction in the road. In Fig. 4 is illustrated a condition of extreme compression opposed to that in Fig.

5. The inner faces of the sides of the rim are provided with inwardly projecting shoulders 13 against which the edges of the side plates 7 strike when the rim shall have moved radially over the side plates to the limit of its travel, the engagement of said shoulders with the edges of said plates preventing the possible separation of the side plates and the rim upon the upper arc of the wheel, as shown in Fig. 5, and also preventing excessive compression of the springs around the lower arc of the wheel, as shown in Fig. 4.

It will now be understood that the arrangement herein shown is such as to flexibly suspend the axle within the rim of the wheel, the compressible and expansible springs interposed between the rim and the felly serving to flexibly connect said parts in a manner to afford a high degree of resiliency, said springs not only yielding vertically, but also laterally so that the springs which are lying in a horizontal or approximately horizontal position, will yield freely so as not to retard the movement between the rim and the felly of the wheel. The marginal portions of the sides of the rim 8 are provided with annular concavities 14 in which is placed a quantity of packing 15 which bears against the sides of the plates 7 and excludes water from the housing in which the springs are located.

To afford a flexible tread, the rim is provided with a tire 16 of rubber or analogous material which is held in place by detachable rings 17 secured to the sides of the rim by the screw bolts 18. To more firmly lock the tire to the rim, these rings are so positioned as to lean inwardly, as shown, and their inner faces are provided with a channel adapted to receive the ends of the cross bars 19 which are embedded in the tire and engage at their ends in said channels. This arrangement not only effectually locks the tire to the rim but also enables it to be readily removed when desired and a new tire easily replaced upon the rim.

Having thus fully set forth my invention, what I claim as new and desire to secure by Letters Patent, is:—

A vehicle wheel comprising a felly, an independent annular plate secured to the face thereof, diverging side plates formed of independent sectors secured to the sides of the felly and embracing said annular plate, an integral channeled rim whose sides embrace said sectional side plates and are slidable thereover, said rim and plates coöperating to form a circular housing, a plurality of coiled springs seated in said housing and compressed therein between said circular plate and the rim of the wheel, and means for excluding water from between the rim and said side plates.

In testimony whereof, I sign this specification in the presence of two witnesses.

IRETT F. TUCKER.

Witnesses:
I. G. HOWLETT,
O. B. BAENZIGER.

---

Copies of this patent may be obtained for five cents each, by addressing the "Commissioner of Patents, Washington, D. C."